United States Patent Office 2,857,254
Patented Oct. 21, 1958

2,857,254
MOTOR FUEL

Charles L. Thomas, Swarthmore, Pa., assignor to Sun Oil Company, Philadelphia, Pa., a corporation of New Jersey No Drawing. Application March 14, 1955
Serial No. 494,250

9 Claims. (Cl. 44—63)

This invention relates to an improved spark ignition engine fuel comprising a major proportion of gasoline hydrocarbons and a minor proportion of an olefin oxide having less than 5 carbon atoms per molecule.

Carburetor icing is a serious problem in the operation of spark ignition internal combustion engines. Such icing occurs as a result of vaporization of the gasoline fuel in the carburetor under certain conditions of temperature and humidity, and the icing results in such deleterious effects as plugging of the fuel inlet into the carburetor with consequent engine stalling.

In practice of the present invention carburetor icing is alleviated or substantially completely overcome. Low molecular weight olefin oxides, i. e., olefin oxides having less than 5 carbon atoms per molecule, which are substantially soluble both in water and in gasoline hydrocarbons, are incorporated in the gasoline fuel in minor amount. These olefin oxides effectively suppress or prevent carburetor icing in spark ignition internal combustion engines. Additionally, the olefin oxides used in this invention improve the anti-knock quality of the gasoline to which they are added. Olefin oxides having 5 or more carbon atoms per molecule are not sufficiently soluble in both water and gasoline to be effectively used in this invention.

The olefin oxides which are used in practice of the present invention are: ethylene oxide, propylene oxide, 1,2-butylene oxide, 2,3-butylene oxide, and isobutylene oxide. These olefin oxides can be used in gasoline individually according to this invention or mixtures of one or more of the olefin oxides can be used.

The olefin oxides are prepared in accordance with methods known to persons skilled in the art. For example, olefin oxides are prepared from the corresponding chlorohydrin by heating the chlorohydrin in aqueous alkali, e. g., sodium hydroxide. Alternatively, the olefin oxides can be prepared directly from the corresponding olefin by contact with oxygen at elevated temperatures in the presence of a catalyst, e. g., a silver catalyst. Other means known in the art for preparing olefin oxides can be employed.

In carrying out this invention, the olefin oxides are incorporated in minor amount in gasoline hydrocarbons which are normally used as fuel in spark ignition internal combustion engines. Such hydrocarbons boil in the range of about 80° F. to 440° F., and usually in the range of about 90° F. to 400 F. The fuel compositions of this invention can contain, in addition to the olefin oxides and hydrocarbons, any of the fuel additives which are commonly employed in the art. It is preferred to use organic-metallic anti-knock agents such as iron carbonyl, bis-cyclopentadienyl iron, and particularly tetraethyl lead in the fuel compositions of this invention. Such anti-knock agents are generally used in amounts of about 0.5 to 5 cc. per gallon of fuel. Scavenging agents can be used with these organo-metallic anti-knock agents. Other additives, e. g., detergents, anti-rust additives, and the like can be used to advantage in the fuel compositions of this invention together with the olefin oxides and gasoline hydrocarbons.

The olefin oxide is added to the gasoline hydrocarbons in minor amount sufficient to suppress internal combustion engine carburetor icing. Generally amounts of olefin oxide in the range of about 0.5% to 10% by volume of the hydrocarbon fuel are suitable to suppress carburetor icing and also to significantly improve the anti-knock quality of the fuel. However, depending upon the initial quality of the fuel and the improvement desired, greater or lesser amounts of olefin oxide than above cited can be used.

The following examples illustrate the improved anti-knock quality of gasoline containing olefin oxide according to the invention.

Gasoline hydrocarbons having Research octane value clear of 83.1 were blended with propylene oxide such that the propylene oxide comprised 5% by volume of the blend. The Research octane value of the blend was 83.8 and the Research octane blending value of the propylene oxide was 96.

T. E. L. was added to the above gasoline hydrocarbons in amount of 1.5 cc. per gallon with resulting Research octane value increase from 83.1 to 91.2. Propylene oxide was blended with this leaded fuel such that the propylene oxide comprised 5% by volume of the blend. The Research octane value of the blend was 92.1, and the Research octane blending value of the propylene oxide was 110.

A 115/145 aviation gasoline was blended with propylene oxide such that the propylene oxide comprised 5% by volume of the blend. The Performance Number blending value of the propylene oxide at rich mixture (3C) was 171.4. The iso-octane plus lead rating of the blend at rich mixture (3C) was 2.07 as compared to 1.90 for the unblended gasoline.

I claim:

1. Motor fuel comprising a major proportion of gasoline and 0.5% to 10% by volume of an olefin oxide selected from the group consisting of ethylene oxide, propylene oxide, 1,2-butylene oxide, 2,3-butylene oxide, and isobutylene oxide.

2. Motor fuel according to claim 1 wherein said olefin oxide is ethylene oxide.

3. Motor fuel according to claim 1 wherein said olefin oxide is propylene oxide.

4. Motor fuel according to claim 1 wherein said olefin oxide is a butylene oxide.

5. Motor fuel comprising a major proportion of gasoline and a minor amount, sufficient to suppress spark ignition engine carburetor icing, of an olefin oxide selected from the group consisting of ethylene oxide, propylene oxide, 1,2-butylene oxide, 2,3-butylene oxide and isobutylene oxide.

6. Motor fuel comprising a major proportion of gasoline, an antiknock amount of tetraethyl lead and a minor amount, sufficient to suppress spark ignition engine carburetor icing, of an olefin oxide selected from the group consisting of ethylene oxide, propylene oxide, 1,2-butylene oxide, 2,3-butylene oxide and isobutylene oxide.

7. Motor fuel acocrding to claim 5 wherein said olefin oxide is ethylene oxide.

8. Motor fuel according to claim 5 wherein said olefin oxide is propylene oxide.

9. Motor fuel according to claim 5 wherein said olefin oxide is a butylene oxide.

References Cited in the file of this patent
UNITED STATES PATENTS

| | | |
|---|---|---|
| 2,229,215 | Magruder et al. | Jan. 21, 1941 |
| 2,552,084 | Bishop et al. | May 8, 1951 |
| 2,599,338 | Lifson et al. | June 3, 1952 |
| 2,706,677 | Duncan et al. | Apr. 19, 1955 |

FOREIGN PATENTS

| | | |
|---|---|---|
| 709,987 | Great Britain | June 2, 1954 |